United States Patent Office 3,034,244
Patented May 15, 1962

3,034,244
GUN BARREL WITH A LAYER OF
RADIOACTIVE MATERIAL
Warren J. Heiman, 1765 Pacific Ave.,
San Francisco, Calif.
No Drawing. Filed Aug. 2, 1954, Ser. No. 447,446
1 Claim. (Cl. 42—76)
(Granted under Title 35, U.S. Code (1952), sec. 266)

This invention may be manufactured and used by or for the Government of the United States of America for governmental purposes without the payment of any royalties thereon or therefor.

This invention relates to methods for determining surface wear, and more particularly to a method for measuring the amount of gun barrel wear in large caliber rifles.

Among the various factors that influence ballistic computations is the amount of gun bore wear caused by friction and erosion from the hot gases generated during firing, such wear reducing the initial velocity of projectiles, and, consequently, the range.

A long-recognized procedure for determining such wear involves the use of a device commonly referred to as a star-gauge, which instrument is inserted into the gun barrel to measure directly the diameter of the bore in terms of bore enlargement. Briefly described, a star gauge comprises a set of the spaced feeler points supported on a long central tube for insertion into the gun barrel. The feeler points are radially actuated by a threaded screw extending to a point outside the barrel where the feeler movements can be observed on a vernier scale reading in thousandths of an inch. From these measurements suitable gun wear and velocity loss data curves can be prepared for shipboard use by which the range can be corrected by interpolation for each firing. While the star gauge long has proven to be of great value, it is inherently limited in accuracy of measurements due to the employment of a threaded control screw which introduces lost motion and, further, because of feeler points wear requiring frequent checking. In addition, a star gauge instrument involves a high initial cost, requires careful handling because of its fragile construction, and use by a skilled operator.

Radioactive tracers have been previously employed in wear-testing compositions for determining the effectiveness of lubricants in preventing wear of moving parts, such as pistons, etc. However, such a process requires a fluid carrier for the radioactivity to permit measurement and is not suitable or capable of measuring gun barrel wear where no lubricant is involved.

Accordingly, a principal object of this invention is to provide a method of determining gun barrel wear capable of more accurate measurements and of obtaining very small increments of wear.

Further objects are to provide a method which does not rely on mechanical controls or feeler points; and to provide a method which is simple and reliable without requiring frequent calibration or replacement of parts.

These and other objects will become apparent from the detailed description.

The objects of the invention are accomplished by the discovery that extreme accuracy in measuring gun barrel wear can be obtained by employing the medium of a radioactive tracer. Any one of a plurality of radioactive materials or isotopes can be used as long as they have a sufficiently long half-life as compared to the life of the gun barrel liner. The radioactive material can be applied as a coating, preferably between the liner and the remainder of the gun barrel or, if desired, the liner may be impregnated with the radioactive substance. In the former modification, liner wear is indicated by increased radioactivity arising from a decreased shielding effect by the liner as measured by means of a suitable energy counter. In the latter modification, liner wear is indicated by a decrease in radioactivity resulting from a loss of radioactivity bearing material in the liner. The foregoing methods should permit the measurement of wear to one ten-thousandth of an inch, or better, which is many fold the accuracy obtainable by star-gauging.

The invention can be practiced most suitably on large caliber rifles usually of a type having a so-called built-up barrel construction, and in naval armament as is well known at the present time, this would include the 6"/47 caliber guns up to the largest rifles, although this category will vary with new designs. Built-up gun barrels are fabricated of a plurality of concentric sleeves usually shrunk one over the other, the innermost sleeve being a liner having machined on its bore a series of spiral grooves, referred to as rifling, for imparting a twist to the projectile about its longitudinal axis as it is propelled through the barrel. In some constructions the liner may be loosely mounted and retained in the barrel by locking washers or the like.

Regardless of the particular manner of mounting, liners are designed to be replaced after a predetermined wear. It is therefore necessary to determine the time for liner replacement, and probably more important, to accurately determine the increments of bore enlargements throughout the life of the liner to be able to correct the range ballistic component in accordance with the accompanying loss of muzzle velocity. Such measurements are conducted for experimental purposes, for preparing the foregoing described ballistic curves, and, also periodically on board ship to obtain variations between a particular gun barrel and the curves based on average performance. These procedures are well known and need not be described.

The present invention comprises the application of a radioactive material on the gun barrel and the measurement of the change in activity arising from gun barrel wear by a suitable apparatus such as a Geiger-Müller counter.

Any one of a plurality of radioactive materials may be employed, either a fairly energetic beta ray, a soft gamma ray or X-ray, depending on the purpose for which the invention is to be used and the orientation of the material on the gun barrel. For example, in experimental testing a radioisotope having a relatively short half-life may be employed, such as 73 day tungsten–185, whereas, for gun barrels in fleet or field use, a radioisotope having a comparatively long half-life would be more suitable, such as 25 year strontium-yttrium–90.

The radioactive material can be applied throughout the entire gun barrel length although a substantial saving in material can be effected by utilizing only that portion of the gun barrel that is subjected to the greatest wear; for example, the chamber end or the muzzle end. A preferred manner of carrying out the invention may be accomplished by applying a coating of the radioactive material within the core of the gun barrel prior to the insertion of the liner or by the use of a preformed sleeve of such material. Thus, the radioactive material is located in the assembled gun barrel between the liner and the remainder of the gun barrel. Any change in intensity of radioactivity transmitted through the liner as measured by a suitable detector will vary directly as the change in thickness of the liner, the transmitted radiation increasing as the shielding effect is decreased by liner wear. The activity readings and wear can be correlated in suitable curves for future use. Of course, the isotope selected must have sufficient energy to pass through the liner and provide a detectable source of radioactivity and yet not present a radiological hazard to gun crew personnel. In addition, some correction factor must be considered to account for the radioactive decay of the particular isotope.

Another means of carrying out the invention may be effected by impregnating the liner with a radioactive material during manufacture in which case the decrease in radioactivity would be a measure of the decreased thickness of liner material resulting from wear. For experimental research, a shell fired through a liner having a radioactive composition could be recovered and the amount of radiactivity removed from the liner be measured. Obviously, such a method would have limitations in shipboard or field use since the gases emitted during firing may contain radioactivity and present a radiological hazard.

The invention affords a single and expedient method for determining gun barrel wear with an accuracy that is far greater than was heretofore possible. Non-experienced personnel may be utilized to take measurements by a counter that will indicate and record the activity readings and for this reason, the method is particularly suitable for shipboard use.

Obviously, many modifications and variations of the present invention are possible in the light of the above teachings. It is, therefore, to be understood that within the scope of the appended claim the invention may be practiced otherwise than as specifically described.

I claim:

A built-up gun including a barrel, a liner concentrically disposed in said barrel, and a layer of radioactive material concentrically disposed between the liner and the gun barrel, said material being capable of transmitting radioactivity through the liner whereby changes of radioactivity arising from liner wear may be measured, said material further being selected in accordance with the thickness and density of said gun barrel for assuring effective absorption of radioactivity by the barrel whereby radioactive emanations through the barrel are minimized to a non-hazardous extent.

References Cited in the file of this patent

UNITED STATES PATENTS

| | | |
|---|---|---|
| 2,264,725 | Shoupp et al. | Dec. 2, 1941 |
| 2,315,845 | Ferris | Apr. 6, 1943 |
| 2,468,905 | Warren | May 3, 1949 |
| 2,486,845 | Herzog | Nov. 1, 1949 |
| 2,660,678 | Sigworth et al. | Nov. 24, 1953 |
| 2,700,111 | Jacobs et al. | Jan. 18, 1955 |

OTHER REFERENCES

Radioactive Isotopes as Tracers, from Power Plant Engineering, Nov. 1947, pages 105–108.

Radioactive Snow Gage with Telemetering System, by J. A. Doremus, from Proceedings of the National Electronics Conference 1950, vol. 6, pages 518–526 (copy in Scientific Library).